US006996126B2

(12) United States Patent
Deml et al.

(10) Patent No.: US 6,996,126 B2
(45) Date of Patent: Feb. 7, 2006

(54) PERFORMANCE IMPROVEMENTS FOR ATM AAL2/5 TO IP PACKET PROCESSING

(75) Inventors: Reinhard Deml, Munich (DE); Andreas Straub, Oberpframmern (DE)

(73) Assignee: Motorola, Inc., Schaumburg, IL (US)

( * ) Notice: Subject to any disclaimer, the term of this patent is extended or adjusted under 35 U.S.C. 154(b) by 878 days.

(21) Appl. No.: 09/975,087

(22) Filed: Oct. 9, 2001

(65) Prior Publication Data

US 2003/0067916 A1   Apr. 10, 2003

(51) Int. Cl.
*H04J 3/22* (2006.01)
(52) U.S. Cl. .................. 370/466; 370/392; 370/467; 370/395.52
(58) Field of Classification Search ................ 370/465, 370/466, 401, 395.5, 395.1, 395.52, 392, 370/474, 356
See application file for complete search history.

(56) References Cited

U.S. PATENT DOCUMENTS

| 5,623,605 | A | * | 4/1997 | Keshav et al. ............... 709/236 |
| 6,366,961 | B1 | | 4/2002 | Subbiah et al. ............. 709/238 |
| 6,519,261 | B1 | * | 2/2003 | Brueckheimer et al. ..................... 370/395.52 |
| 6,522,667 | B1 | * | 2/2003 | Oda et al. .................... 370/474 |
| 6,728,261 | B1 | * | 4/2004 | Sasson et al. ............... 370/466 |
| 6,801,542 | B1 | * | 10/2004 | Subbiah ...................... 370/467 |
| 6,819,678 | B2 | * | 11/2004 | Sylvain ...................... 370/466 |

* cited by examiner

*Primary Examiner*—Ricky Ngo
*Assistant Examiner*—Nguyen H. Ngo
(74) *Attorney, Agent, or Firm*—Kevin D. Wills (57) ABSTRACT

A network interface of a UMTS radio network controller encapsulates incoming AAL2/AAL5 packetized data such that it can be used on an Ethernet based IP network. A hardware unit is used to calculate additional information for the protocol overhead, including calculating length and error checking values. A partial header information is stored and used for each encapsulated packet of a session. In a preferred embodiment, the incoming packets are buffered in a linked data buffer including a linked list with pointers to the partial header information for the session as well as pointers to the incoming packets.

47 Claims, 5 Drawing Sheets

| ETHERNET FRAME HEADER PORTION | UNUSED | DESTINATION MAC ADDRESS |
|---|---|---|
| | DESTINATION MAC ADDRESS ||
| | SOURCE MAC ADDRESS ||
| | SOURCE MAC ADDRESS | ETHERNET TYPE (IN HW) |
| IP HEADER PORTION | VERSION / TYPE OF SERVICE | TOTAL LENGTH (IN HW) |
| | IDENTIFICATION | FLAG / FRAGMENTATION |
| | TIME TO LIVE / PROTOCOL ID | IP HEADER CHECKSUM (IN HW) |
| | SOURCE IP ADDRESS ||
| | DESTINATION IP ADDRESS ||
| UDP HEADER PORTION | UDP SOURCE PORT | UDP DESTINATION PORT |
| | UDP MESSAGE LENGTH (IN HW) | UDP CHECKSUM (IN HW) |

PERFORMANCE IMPROVEMENTS FOR ATM AAL2/5 TO IP PACKET PROCESSING

BACKGROUND OF THE INVENTION

The present invention relates to network interfaces of universal mobile telecommunication systems (UMTS) radio network controllers. The network interface of a UMTS radio network controller routes asynchronous transfer mode (ATM) adaptation layer 2 (AAL2) and ATM adaptation layer 5 (AAL5) packetized data to an Ethernet-based Internet Protocol (IP) network.

Typically, these operations are implemented in software that uses parameters stored in lookup tables and creates the protocol headers from scratch in order to encapsulate the AAL2/AAL5 packets in an Ethernet Frame. The Ethernet header, IP header, User Datagram Protocol (UDP) packet header, and Ethernet frame Cyclical Redundancy Check (CRC) information are produced. This results in a significant amount of calculations for each Ethernet frame produced. These calculations can significantly slow the operation of the system.

It is desired to have a system with improved performance for implementing the encapsulation of AAL2/AAL5 packetized data in a network interface of a UMTS radio network controller.

SUMMARY OF THE PRESENT INVENTION

In the present invention, partial header data is buffered for each session. Each AAL2/AAL5 packet that belongs to a particular session is associated with the same predefined partial header data stored in the buffer. The partial header data does not include all of the fields of the header. The partial header data along with the AAL2/AAL5 packet is provided to hardware which calculates the length information and error check information (checksums and CRC) required to produce a complete Ethernet frame.

By setting up the header buffer for each session and by using hardware to calculate portions of the header and the Ethernet frame CRC, the speed of the system of the present invention is significantly improved. The performance gain of one embodiment of the system of the present invention compared to an off-the-shelf network protocol stack is about eight times. Even if the user optimizes the prior-art protocol stack, the performance gain of one embodiment of the system of the present invention is in the range of 4–5 times.

The ATM header of the incoming AAL2/AAL5 packets is used to indicate the session and thus indicate which stored partial header information is provided to the hardware.

In a preferred embodiment, the partial header information is calculated once per session and stored in a data buffer. The linked list of data buffers includes a pointer to the partial header data for that session and a pointer to the buffer storing the AAL2/AAL5 packet.

In one embodiment of the present invention, a field in incoming packets is used to access stored partial header information. In hardware, the stored partial header information and the incoming packets are used to calculate additional information. The additional information including at least one length field and at least one error check field, the output of the hardware being the incoming packet encapsulated by one or more protocols.

Another embodiment of the present invention is a method for each session, constructing and storing partial header information. The partial header information including source and destination fields. Using a field in the incoming packets to access stored partial header information, the same partial header information being used for each incoming packet of the session. In hardware, using the stored partial header information and the incoming packets to calculate additional information. The additional information including at least one length field and at least one error check field. The output of the hardware being one of the incoming packets encapsulated by one or more protocols.

In one embodiment, the protocols include the UDP protocol, the IP protocol, and an Ethernet protocol. In one embodiment the additional information includes the UDP message length, a UDP checksum value, an IP header checksum, an IP total length value, an Ethernet frame payload length, and an Ethernet frame CRC value.

One embodiment of the present invention is a UMTS system including a radio network controller including a network interface. The network interface includes software adapted to store partial header information for a session. The session indicated by a field of incoming packets. The stored partial header information including source and destination information for at least one protocol. The network interface also including hardware receiving the stored partial header information in the incoming packets. The hardware is adapted to calculate additional information for the outgoing data. The additional information including at least one length field and at least one error check field.

In one embodiment, a data transmitter machine according to the invention is built in two stages, which are pipelined. The first part of the machine produces data packets represented by a sequence of a header and the data block. The header information transferred between the two stages contains some data fields which are not evaluated to their final value. The data block contains a predefined number of parameters(data fields), which are inserted into the data block to the positions transferred immediately after the header. The second stage uses the parameter transferred in the data block to compute the final value of the header data. The first stage may be a conventional interface component with software providing the half-evaluated header blocks and linking the data blocks with the inclusion of the individual parameter information to the head of the data block. The second stage is typically hardware, producing the correct header computed from the half-evaluated header and the parameter informations, and then transferring the data block (without the parameters).

DETAILED DESCRIPTION OF THE INVENTION

Figure 1:
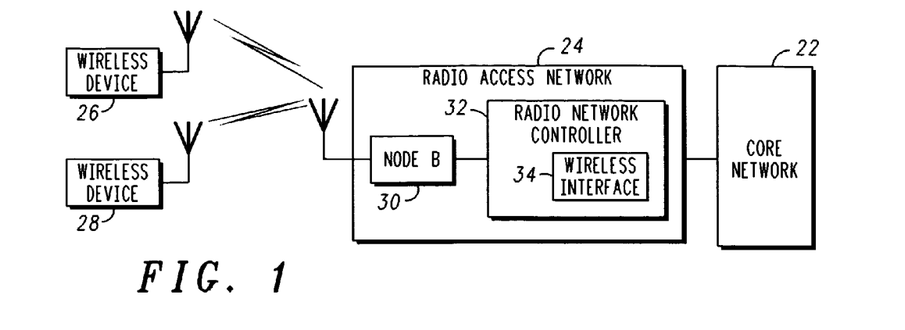
FIG. 1 illustrates a UMTS wireless network which can use the system of the present invention.

FIG. 1 is a diagram of a UMTS wireless network. The network includes a core network 22, a radio access network 24 and wireless devices 26 and 28. The radio access network 24 includes a Node B 30 and a radio network controller 32. The radio network controller 32 includes a network interface 34. In one embodiment the network interface receives ATM cells and reassembles a AAL2/AAL5 packet and encapsulates these packets in additional protocols. In a preferred embodiment, the AAL2/AAL5 packets are encapsulated in the UDP protocol, the IP protocol, and an Ethernet protocol.

Figure 2:
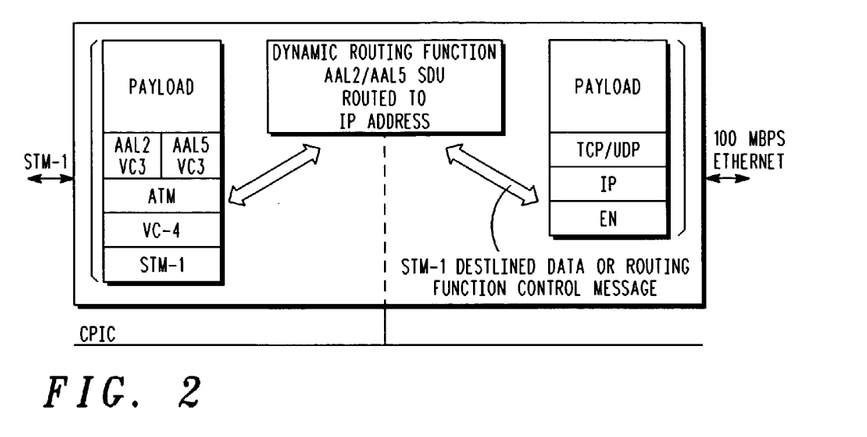
FIG. 2 is a diagram that illustrates the AAL2/AAL5 packetized data encapsulation of one embodiment of the present invention.

FIG. 2 illustrates a network interface of one embodiment of the system in the present invention. In this embodiment, ATM cells are received, reassembled and then, based upon the ATM cell header of AAL2/AAL5 packets, are routed using the Ethernet protocol. In one embodiment, AAL2 packets are routed based upon the ATM Virtual Channel (VC) and the sub-channel identifier (CID); the AAL5 packets are routed based upon the ATM virtual channel (VC). Each ATM AAL5 connection and ATM AAL2 sub-channel is mapped to a unique UDP/IP session identified by an IP destination address and a UDP destination port number. The VC (for AAL5 packets) or VC and CID (for AAL2 packets) are used to access a routing table which allows the production of the header and other overhead associated with the protocols.

An ATM cell header consists of an 8 bit virtual path identifier and a 12 bit virtual channel identifier. Together they identify the ATM virtual channel (VC). For AAL5 packets, only the ATM cell header, VC, is used to identify the session. The VC information can be added as additional information inside the AAL5 packet. For AAL2 packets, the VC from the ATM cell header and the subchannel ID (CID) which is part of the AAL2 packets are used to identify the session.

In prior-art systems, this overhead calculation is done purely in software. The network driver takes the parameters and creates the protocol header and footer required. This can be quite time-consuming since it requires a lot of calculations and memory transactions.

Figure 3:
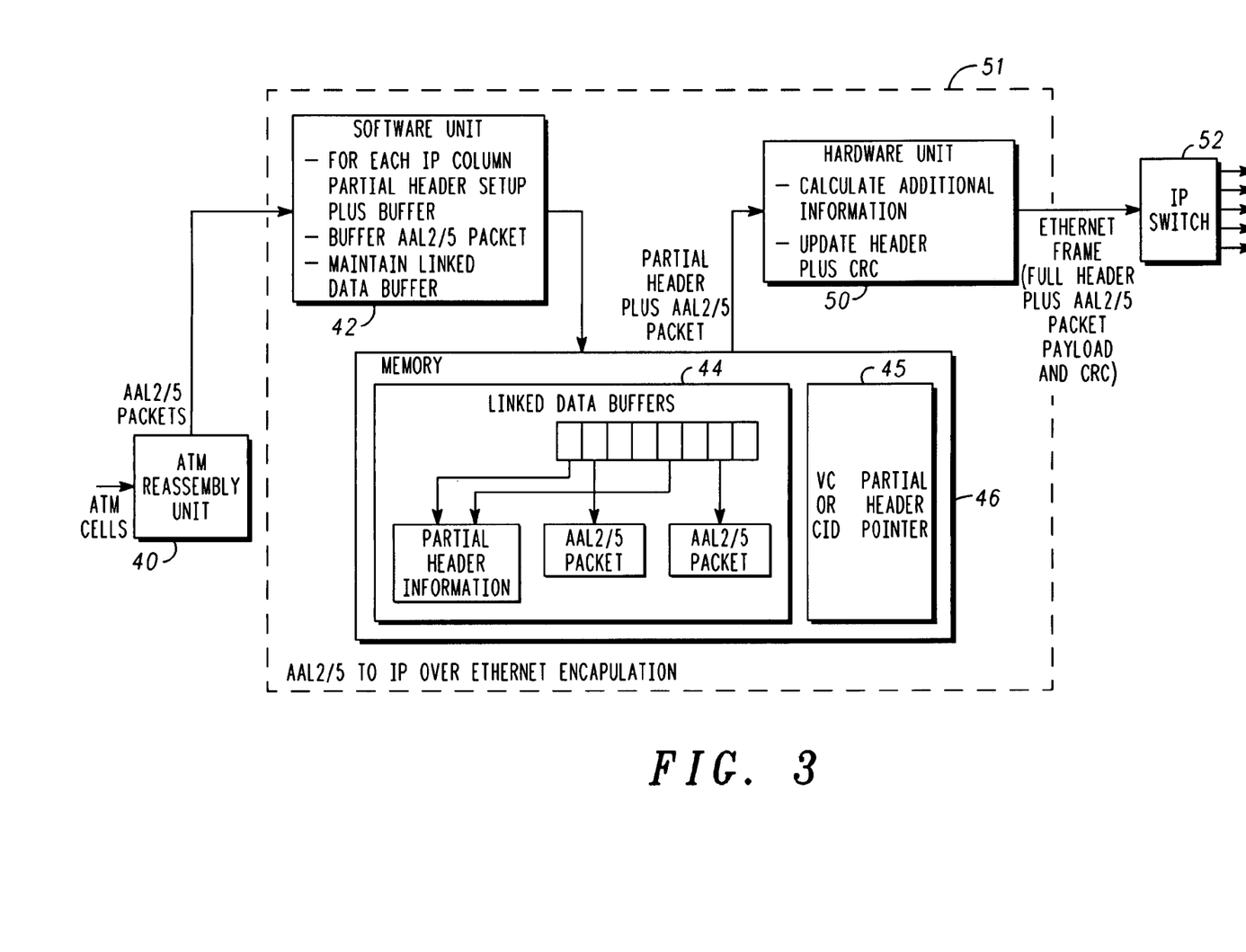
FIG. 3 is a diagram that illustrates one embodiment of the present invention using a software unit and a hardware unit.

FIG. 3 illustrates a system of one embodiment of the present invention. In this embodiment, the ATM cells are received at an ATM reassembly unit 40. The ATM reassemble unit takes the ATM cells and reconstructs AAL2/5 packets. In a preferred embodiment, the AAL2/AAL5 packet has appended to it a packet length value. The packets are sent to software unit 42. In a preferred embodiment, the software unit, for each IP session, prepares a partial header and buffers it in the buffer 44 of the memory 46. As will be described below, the buffer is preferably set up as a linked data buffer 44. In one embodiment, each of the AAL2/AAL5 packets are buffered in the linked data buffer 44. The software unit preferably maintains the linked data buffer 44.

The partial header information set up for each IP session preferably includes the source and destination information for each of the protocols used. The partial header information and the AAL2/AAL5 packet is provided to the hardware unit 50. Hardware unit 50 calculates the additional information required and updates the header and, in a preferred embodiment, calculates the Ethernet frame CRC footer. Thus, the output of the hardware unit 50 is an Ethernet frame which can be sent to an IP switch 52, which switches based upon the IP protocol.

Figure 4:
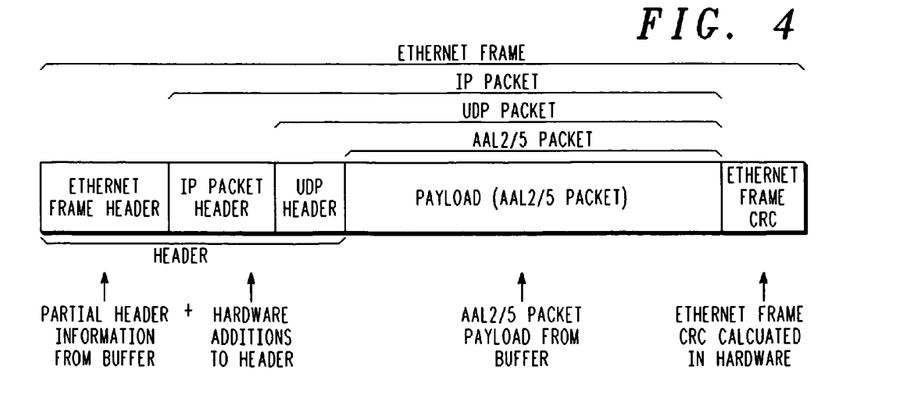
FIG. 4 is a diagram that illustrates the hardware and software unit contributions to the Ethernet frame encapsulation of one embodiment of the system of the present invention.

FIG. 4 is a diagram that illustrates the contributions from the hardware and the software to the constructed Ethernet frame in one embodiment of the system of the present invention. The AAL2/AAL5 packet acts as a payload for UDP packet which includes a UDP header and the payload. The UDP packet is a payload for the IP packet which further includes an IP packet header. The IP packet acts as the payload for the Ethernet frame which further adds the Ethernet frame header and the Ethernet frame CRC footer. The header is comprised of the Ethernet frame header, the IP packet header and the UDP header. These protocols are used in a preferred embodiment, but other protocols can be used. Partial header information is provided from the buffer. This partial header information includes source and destination information such as the source and destination address and source and destination port. Additional header information is produced in the hardware. In a preferred embodiment, the Ethernet frame CRC is also calculated in hardware.

Figure 5:
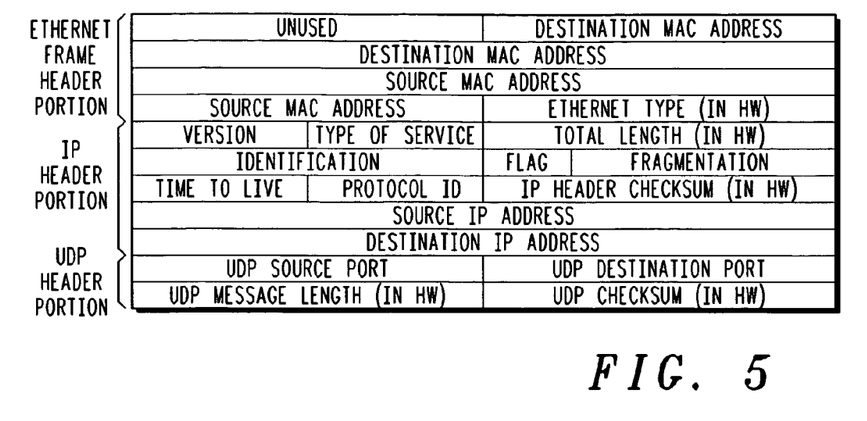
FIG. 5 is a diagram that illustrates the header information used in one embodiment of the present invention.

FIG. 5 illustrates the header information of one embodiment of the system in the present invention. The header information includes an Ethernet frame header portion, an IP header portion and a UDP header portion. The Ethernet frame header portion includes a destination Medium Access Control (MAC)address, a source MAC address and the Ethernet type field. The source and destination addresses are determined in software for once for each session. In the example of FIG. 3, the source MAC address is the MAC address of unit 51. The destination MAC address is the MAC address of the IP switch 52. The Ethernet type for payloads of 1536 or fewer bytes indicates the length of the Ethernet frame payload. As will be described below, this length is preferably calculated in hardware.

The IP header portion includes a version field, a type of service field, identification field, a fragmentation field, a time to live field, protocol ID field, the source IP address and destination IP address. Many of the fields are fixed for each IP session. The source and destination IP address and UDP source port and destination port depend upon a field in the AAL2/AAL5 packet which provides an index to a routing table. Note that the IP header checksum and total length are preferably calculated in hardware. The UDP header portion includes a UDP source port, a UDP destination portion which are determined in software and UDP message length and UDP checksum which are calculated in hardware.

The partial header information is set up once per IP session when the IP session is established and reused for each incoming packet of of the IP session. Instead of creating each IP packet from scratch as is done in the prior art network software drivers, the data buffers only have to be linked together with transmit buffer descriptors. The software just links but does not modify the partial header data buffer after the partial header data buffer is constructed.

Looking again at FIG. 3, in one embodiment, the routing table 45 uses a field of the AAL2/AAL5 incoming packets, such as the VC or a CID field, as an index to determine the partial header pointer. If a new session is being set up, the partial header needs to be constructed as well as a pointer to the partial header. The pointer information is added to the routing table 45.

Figure 6:
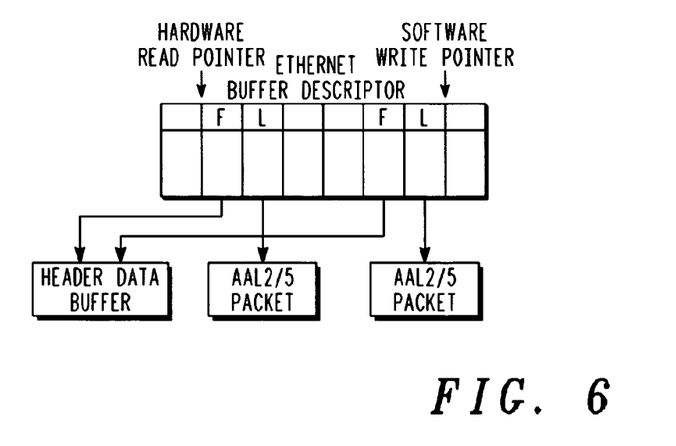
FIG. 6 is a diagram that illustrates a linked data buffer used in one embodiment of the present invention.

FIG. 6 is a diagram that illustrates the linked data buffer of one embodiment of the present invention. As each packet is received, a field of the incoming packet is checked in a routing table to determine a partial header pointer. If there is a partial header pointer, this pointer is added as the first buffer descriptor for the packet. If there is not a partial header pointer, the VC (for AAL5 packets) or VC and CID (for AAL2 packets) indicates a new session, and the software unit will construct the partial header information. The partial header information indicates the source and destination for the different protocols. The partial header is stored in the buffer. Also a pointer to this buffer location will also be produced and added to the routing table 45 associated with the VC or VC and CID. Note that each AAL2/AAL5 packet received for a session has its first buffer descriptor pointing to the same partial header data. The other buffer descriptors of a packet point to the buffer locations where the AAL2/AAL5 packet is stored.

For each AAL2/AAL5 packet, the linked list will include a pointer to the covered the partial header information as well as a pointer to the packet. The hardware uses a hardware read pointer to obtain the pointers to the partial header information and the packet. The linked list data buffer 42 transfers the incoming packets in a first-in first-out fashion.

Figure 7:
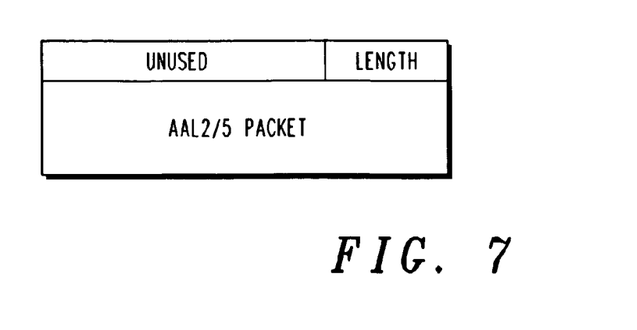
FIG. 7 is a diagram that illustrates an AAL2/AAL5 packet with an appended length value which is used in one embodiment of the system of the present invention.

FIG. 7 illustrates the AAL2/AAL5 packet with the appended length information. The appended length information is determined in the AAL ATM reassembly process. By appending this length information to the packet, the operations of the hardware unit 50 can be simplified. Note that in other embodiments the software or hardware unit itself calculates the length, but it is simplest to append the length in the reassembly unit.

Figure 8:
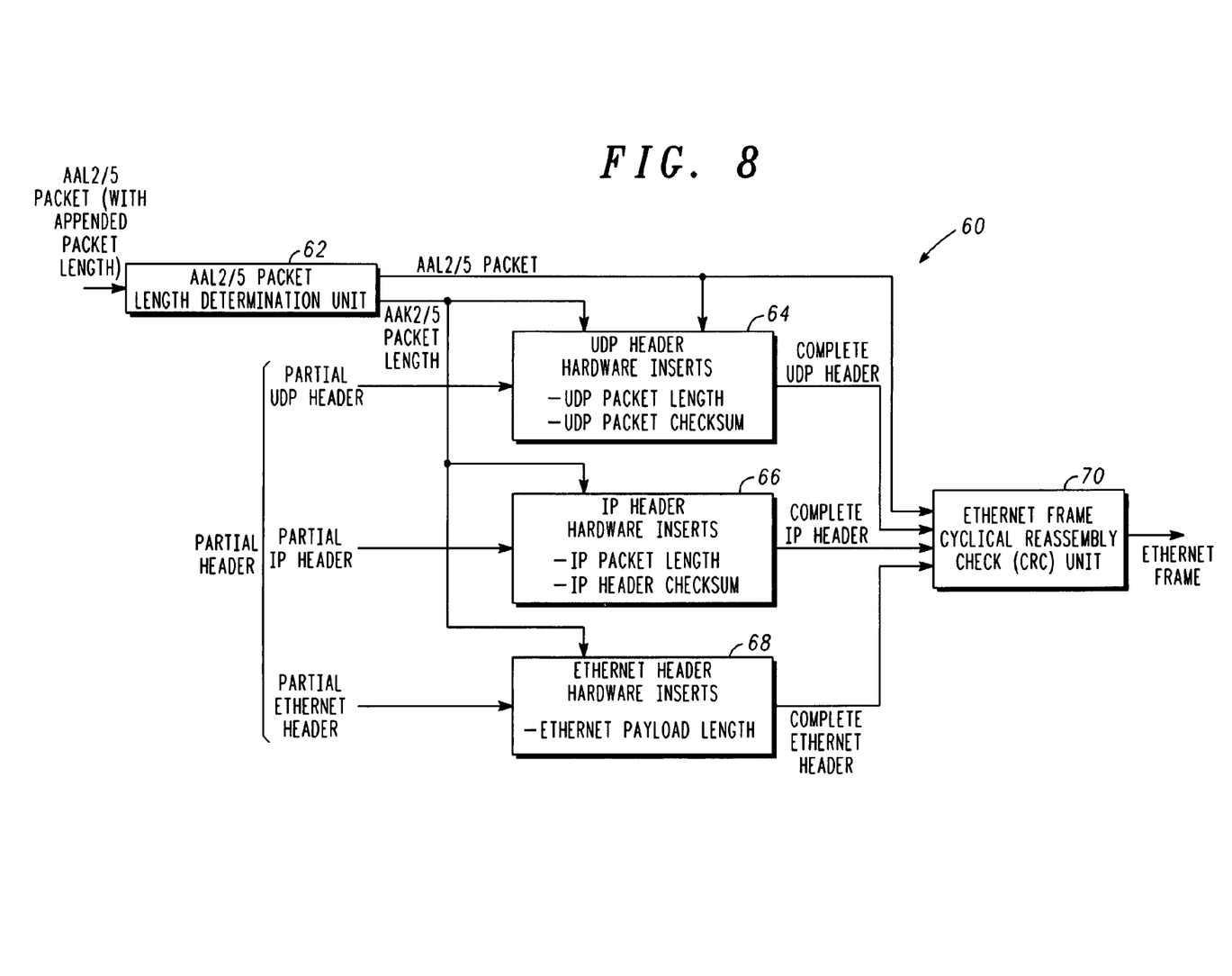
FIG. 8 is a diagram that illustrates a hardware unit of one embodiment of the system of the present invention.

FIG. 8 is a diagram of one embodiment of a hardware unit of one embodiment of the system of the present invention. The hardware unit receives the incoming packet, in one embodiment the AAL2/AAL5 packet with appended packet length. A packet length determination unit 62 separates the packet length from the incoming packet. The AAL2/AAL5 packet length information is used to calculate the length fields for the different protocols. In this embodiment the UDP, IP and Ethernet protocols are used. The partial header includes a partial UDP header provided to the UDP header hardware unit 64, a partial IP header provided to the IP header hardware unit 66 and a partial Ethernet header provided to the Ethernet header hardware insert unit 68. The UDP header hardware inserts include a UDP packet length insert and a UDP packet checksum insert. The UDP packet length can be calculated by adding the UDP header length, which is a constant, to the AAL2/AAL5 packet length. The UDP packet checksum is a checksum of the UDP packet including the header and the payload, in this case the AAL2/AAL5 packet. The IP header hardware unit 66 determines the IP packet length which is, in this case, the AAL2/AAL5 packet length added to a constant for the combined IP header and UDP header length. The IP header checksum is a checksum on the IP header excluding the payload, meaning that the unit 66 does not depend upon the calculations of the unit 64 and can operate in parallel. The Ethernet header hardware unit 68 determines the Ethernet payload length. As noted above, for payloads of 1536 bytes or less, the Ethernet type field contains the Ethernet payload length which, in this case, is the same as the IP packet length. The outputs of the units 64, 66 and 68 include the complete header. The header information along with the AAL2/AAL5 packet is provided to the Ethernet frame cyclical redundancy check (CRC) unit 70. Note that the operations of the Ethernet frame cyclical redundancy check unit 70 is dependent upon the operation of the header insert units 64, 66, and 68 and must wait for these units to operate it before calculating the CRC.

A cyclical redundancy check for a k-bit input determines an n-bit sequence known as a frame check sequence so that the resulting frame consisting of k+n bits is exactly divisible by a predetermined number. This number is indicated by the divisor polynomial, P(X). In the one embodiment, the CRC logic is implemented as a dividing circuit consisting of exclusive-or gates input into a shift register. The exclusive-or gate arrangement is determined by the divisor polynomial.

Figure 9:
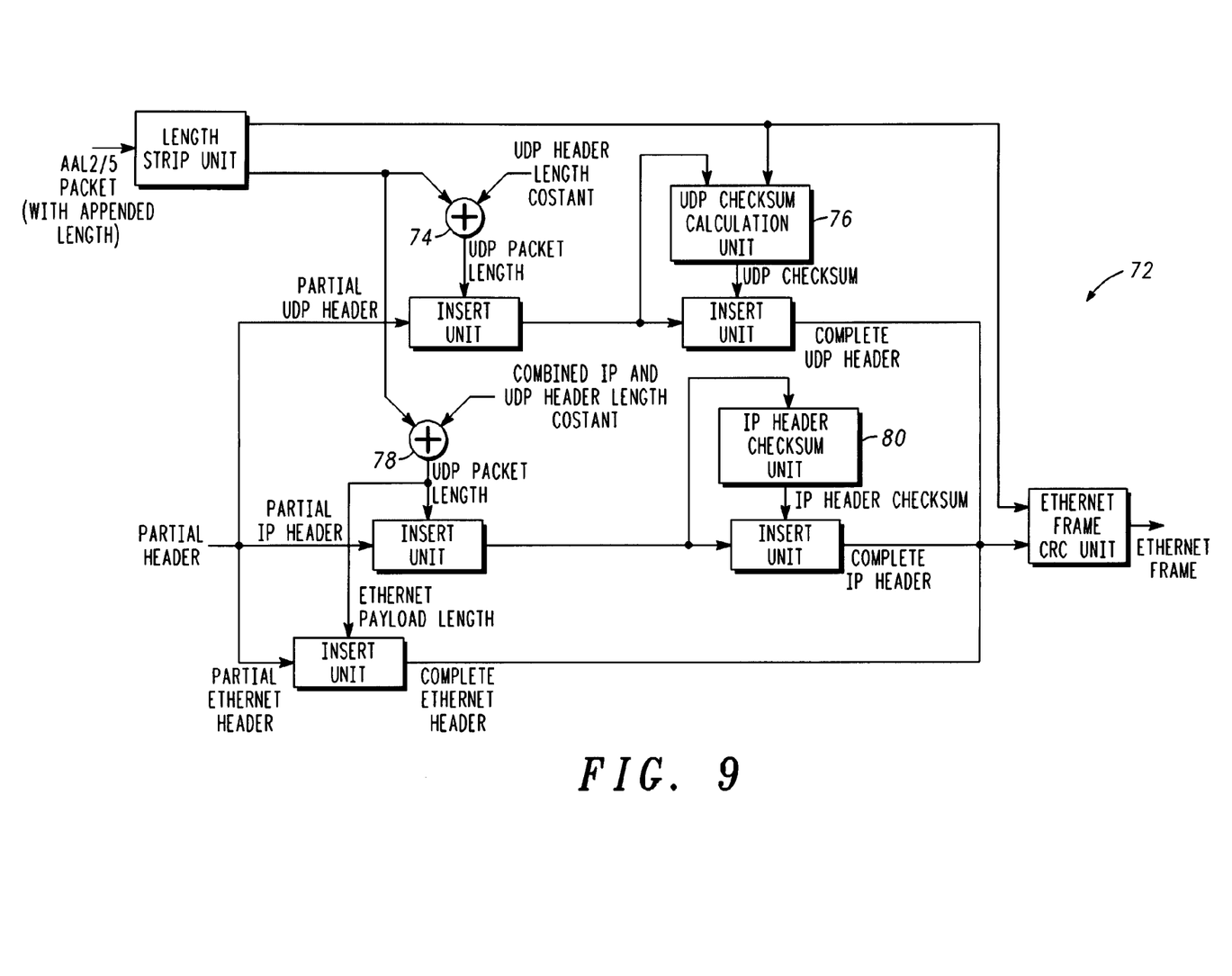
FIG. 9 is a diagram that illustrates details of one embodiment of a hardware unit of the system of the present invention.

FIG. 9 illustrates details of one embodiment of the hardware unit 72 of one embodiment of the present invention. In this embodiment, note that the UDP packet length is calculated by an adder 74 adding the incoming packet length to the UDP header length constant. The UDP checksum calculation unit 76 uses the updated UDP header information along with the incoming packet to calculate the UDP checksum value which is then inserted to produce the complete UDP header. The adder 78 adds the incoming packet length to the combined IP and UDP header length constant to produce the IP packet length. Note that the IP packet length is also the Ethernet payload length which is inserted into the partial Ethernet header. The IP checksum unit 80 determines the checksum for the IP header using the partial IP header after the IP packet length is inserted. As discussed above, the output of the adder 78 can be used in both the IP header hardware insert unit and the Ethernet header hardware insert unit. Alternately, multiple adder units can be used.

Note that the embodiments of FIGS. 8 and 9 are merely one example of a hardware unit and a number of arrangements can be used to implement the hardware unit. In a preferred embodiment the hardware unit is implemented in a field programmable gate array. Alternately the hardware unit can be implemented in any other fashion such as in an application specific integrated circuit (ASIC).

It will be appreciated by those of ordinary skill in the art that the invention can be implemented in other specific forms without departing from the spirit or character thereof. The presently disclosed embodiments are therefore considered in all respects to be illustrative and not restrictive. The scope of the invention is illustrated by the appended claims rather than the foregoing description, and all changes that come within the meaning and range of equivalents thereof are intended to be embraced herein.

What is claimed is:

1. A method comprising:
   using information from incoming packets to access stored partial header information; and
   in hardware, using the stored partial header information and the incoming packets to calculate additional information, the additional information including at least one length field and at least one error check field, the output of the hardware being the incoming packet encapsulated by one or more protocols, wherein the hardware includes protocol header insert units and an Ethernet frame CRC unit.

2. The method of claim 1 wherein the one or more protocols includes the IP protocol.

3. The method of claim 1 wherein the one or more protocols includes a UDP protocol, a IP protocol and an Ethernet protocol.

4. The method of claim 1 wherein the additional information includes at least one length field and at least one error check field.

5. The method of claim 4 wherein the additional information includes a UDP message length, a UDP checksum value, an IP header checksum, an IP total length value, an Ethernet frame payload length and an Ethernet CRC value.

6. The method of claim 1 wherein the method is implemented in a network interface.

7. The method of claim 6 wherein the network interface is in a radio network controller of a UMTS system.

8. The method of claim 1 wherein the incoming packets are AAL packets.

9. The method of claim 8 wherein the information from incoming packets includes virtual channel (VC) information.

10. The method of claim 8 wherein information form incoming packets includes virtual channel (VC) information and subchannel ID (CID) information.

11. The method of claim 1 wherein software constructs partial header information and stores the partial header information.

12. The method of claim 11 wherein the software uses a linked data buffer to store the constructed partial header information along with incoming packets in a linked list including a first pointer to the header data and a second pointer to the buffered incoming packet, the first pointer being the same for each stored incoming packet of a session.

13. A method comprising:
buffering incoming packets and partial header information for a session;
producing a linked list of pointers to the partial header information for a session and buffered incoming packets, to provide a linked data buffer; and
in hardware, using the stored partial header information and the incoming packets form the linked data buffer to calculate additional information, the additional information including at least one length field and at least one error check field, the output of the hardware being the incoming packet encapsulated by one or more protocols, wherein the hardware includes protocol header insert units and an Ethernet frame CRC unit.

14. A network controller comprising:
a linked data buffer including buffered incoming packets and partial header information for a session and a linked list of pointers to the partial header information for a session and buffered incoming packets; and
hardware receiving the stored partial header information and the incoming packets from the linked data buffer, the hardware adapted to calculate additional information for outgoing data, the additional information including at least one length field and at least one error check field, wherein the hardware includes protocol header insert units and an Ethernet frame CRC unit.

15. A method comprising
for a session, constructing and storing partial header information, the partial header information including source and destination fields;
using information from incoming packets to access the stored partial header information, the same partial header information being used for each incoming packet of the session; and
in hardware, using the stored partial header information and the incoming packets to calculate additional information, the additional information including at least one length field and at least one error check field, the output of the hardware being one of the incoming packets encapsulated by one or more protocols, wherein the hardware includes protocol header insert units and an Ethernet frame CRC unit.

16. The method of claim 15 wherein the source and destination fields are addresses.

17. The method of claim 15 wherein the source and destination fields are source and destination port fields.

18. The method of claim 15 wherein the one or more protocols includes the IP protocol.

19. The method of claim 18 wherein the one or more protocols includes a UDP protocol, a IP protocol and an Ethernet protocol.

20. The method of claim 15 wherein the additional information includes a UDP message lengths, a UDP checksum value, an IP header checksum, an IP total length value, an Ethernet frame payload length and an Ethernet CRC value.

21. The method of claim 15 wherein a unit appends a incoming packet length to the incoming packet.

22. The method of claim 21 wherein the hardware uses the appended length to calculate the additional information.

23. The method of claim 15 wherein the incoming packets are AAL2/AAL5 packets.

24. A method comprising:
reassembling AAL packets from ATM cells;
using information form the AAL packets to access stored partial header information; and
in hardware, using the stored partial header information and the AAL packets to calculate additional information, the additional information including at least one length field and at least one error check field, the output of the hardware being an AAL packet encapsulated by one or more protocols, at least one of the one or more protocols being the IP protocol, wherein the hardware includes protocol header insert units and an Ethernet frame CRC unit.

25. The method of claim 24 wherein the reassembling units appends a AAL packet length to the AAL packet.

26. The method of claim 24 wherein the information from the AAL packets include CID and VC information for an AAL2 packet or VC information for an AAL5 packet.

27. The method of claim 24 wherein the one or more protocols includes the IP protocol.

28. The method of claim 24 wherein the one or more protocols includes a UDP protocol, a IP protocol and an Ethernet protocol.

29. The method of claim 24 wherein the at least one error check field is a checksum field.

30. The method of claim 24 wherein at least one error check field is a CRC field.

31. The method of claim 24 wherein software stores a pointer to the stored partial header information in a linked data buffer.

32. The method of claim 31 wherein the software also stores a pointer to the buffered incoming packet in the linked data buffer.

33. The method of claim 24 wherein the hardware receives the AAL packet length.

34. The method of claim 24 wherein the reassembly step includes appending the AAL packet length to the AAL packet.

35. A method comprising:
reassembling AAL packets form ATM cells;
using information from the AAL packets to access stored partial header information; and
in hardware, using the stored partial header information and the AAL packets to calculate additional information, the additional information including a UDP message length, a UDP checksum value, an IP header checksum, an IP total length value, an Ethernet frame payload length and an Ethernet frame CRC value, the output of the hardware being an AAL packet payload encapsulated according to the UDP protocol, IP protocol, and an Ethernet protocol, wherein the hardware includes protocol header insert units and an Ethernet frame CRC unit.

36. A network controller comprising:

software adapted to store partial header information for a session, the session indicated by information from incoming packets, the stored partial header information including source and destination information for at least one protocol, the same partial header information being used for each incoming packet of the session; and hardware receiving the stored partial header information and the incoming packets, the hardware adapted to calculate additional information for outgoing data, the additional information including at least one length field and at least one error check field, wherein the hardware included protocol header insert units and an Ethernet frame CRC unit.

37. The network controller of claim 36 wherein the software stores the partial header information and incoming packet in a buffer.

38. The network controller of claim 36 wherein a linked list includes pointers to the partial header information and buffered incoming packet.

39. The network controller of claim 36 wherein the network controller is part of a radio network controller in a UMTS system.

40. The network controller of claim 36 wherein at least one error check field is a checksum.

41. The network controller of claim 36 wherein at least one error check field is a cyclical redundancy check field.

42. The method of claim 36 wherein the incoming packets are encapsulated in at least one additional protocol.

43. The network controller of claim 36 wherein the incoming packets are encapsulated in a UDP protocol, a IP protocol and an Ethernet protocol.

44. The network controller of claim 36 wherein the incoming packets are AAL packets.

45. The network controller of claim 36 wherein the additional information includes a UDP message length, a UDP checksum value, an IP header checksum, an IP total length value, an Ethernet frame payload length and an Ethernet CRC value.

46. A network controller comprising:

software adapted to store partial header information for a session, the session indicated by information from incoming packets, the stored partial header information including source and destination information for a UDP protocol, an IP protocol, and an Ethernet protocol, the same partial header information being used for each incoming packet of the session; and hardware receiving the stored partial header information and the incoming packets, the hardware adapted to calculate additional information for outgoing data, the additional information including a UDP message length, a UDP checksum value, an IP header checksum, an IP total length value, an Ethernet frame payload length and an Ethernet CRC value, the output of the hardware being an AAL packet payload encapsulated according to the UDP protocol, IP protocol and the Ethernet protocol, wherein the hardware includes protocol header insert units and an Ethernet frame CRC unit.

47. A UMTS system comprising:

a radio network controller including a network interface, the network interface including software adapted to store partial header information for a session, the session indicated by information from incoming packets, the stored partial header information including source and destination information for at least one protocol, the same partial header information being used for each incoming packet of the session; and hardware receiving the stored partial header information and the incoming packets, the hardware adapted to calculate additional information for outgoing data, the additional information including at least one length field and at least one error check field, wherein the hardware includes protocol header insert units and an Ethernet frame CRC unit.

* * * * *